US011803443B2

(12) United States Patent
Fujita

(10) Patent No.: US 11,803,443 B2
(45) Date of Patent: Oct. 31, 2023

(54) STORAGE SYSTEM, DATA COPY CONTROL METHOD, AND RECORDING MEDIUM

(71) Applicant: Hitachi, Ltd., Tokyo (JP)

(72) Inventor: Shota Fujita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/691,164

(22) Filed: Mar. 10, 2022

(65) Prior Publication Data

US 2023/0123502 A1 Apr. 20, 2023

(30) Foreign Application Priority Data

Oct. 19, 2021 (JP) ................. 2021-171133

(51) Int. Cl.
G06F 11/00 (2006.01)
G06F 11/10 (2006.01)
G06F 11/20 (2006.01)
G06F 3/06 (2006.01)

(52) U.S. Cl.
CPC ........ G06F 11/1096 (2013.01); G06F 3/0604 (2013.01); G06F 3/065 (2013.01); G06F 3/0689 (2013.01); G06F 11/2094 (2013.01); G06F 2201/845 (2013.01)

(58) Field of Classification Search
CPC ............. G06F 11/1096; G06F 11/2094; G06F 2201/845
USPC ...................................................... 714/1–57
See application file for complete search history.

(56) References Cited

U.S. PATENT DOCUMENTS

| 8,832,035 B2* | 9/2014 | Raj ....................... G06F 3/0619 711/170 |
| 2005/0138284 A1* | 6/2005 | Cohn .................... G06F 3/0643 711/114 |
| 2009/0132619 A1* | 5/2009 | Arakawa ............... G06F 3/0641 |
| 2010/0031000 A1* | 2/2010 | Flynn .................. G06F 16/9014 711/216 |
| 2011/0252274 A1* | 10/2011 | Kawaguchi ......... G06F 11/1076 711/216 |
| 2012/0124307 A1* | 5/2012 | Ashutosh ............ G06F 11/1456 711/E12.001 |
| 2014/0317479 A1* | 10/2014 | Candelaria .......... G06F 11/0727 714/807 |
| 2015/0254128 A1* | 9/2015 | Satoyama ............... G06F 12/16 714/15 |

(Continued)

FOREIGN PATENT DOCUMENTS

JP 2019159605 A 9/2019
JP 2019212081 A 12/2019

*Primary Examiner* — Sarai E Butler
(74) *Attorney, Agent, or Firm* — MATTINGLY & MALUR, PC

(57) ABSTRACT

A storage apparatus includes a plurality of drives and has a parity group constituted by a plurality of drives. The storage apparatus stores a hash management table to manage hash values of a prescribed data unit of data of the drives constituting the parity group and a hash value of a prescribed data unit of data stored in another drive other than the drives constituting the parity group. A processor is configured to determine whether a same data unit as a data unit included in data stored in a replacement target drive exists in the other drive on a basis of the hash values, and copy the same data unit of the other drive to a replacement destination drive when the same data unit exists.

7 Claims, 9 Drawing Sheets

(56) References Cited

U.S. PATENT DOCUMENTS

| | | | | |
|---|---|---|---|---|
| 2015/0286663 A1* | 10/2015 | Mangan, III | ........ | G06F 16/9562 |
| | | | | 707/722 |
| 2016/0259693 A1* | 9/2016 | Sundararaman | .... | G06F 16/2365 |
| 2019/0213077 A1* | 7/2019 | Hofstee | ............... | G06F 11/1076 |
| 2019/0278484 A1 | 9/2019 | Tatsumi et al. | | |

* cited by examiner

FIG. 2

| Copy pattern | Data attribute | Hash match |
|---|---|---|
| A | Not DRD | --- |
| B | DRD | Not matched |
| C | DRD | Matched |

| VOL# | Slot # | Data attribute |
|---|---|---|
| 0 | 1 | Non-DRD |
| 0 | 2 | DRD |
| 1 | 1 | Non-DRD |
| ... | ... | ... |

| VOL# | Hash value | Data storage destination address |
|---|---|---|
| 0 | 0 | ... |
| 0 | 1 | ... |
| 0 | 2 | ... |
| ... | ... | ... |
| 1 | 5 | ... |
| ... | ... | ... |

| PG# | Drive# | Slot# | Drive copy target |
|---|---|---|---|
| 1-1 | 1 | 1 | Target |
| 1-1 | 1 | 2 | Target |
| 1-1 | 2 | 1 | Non-target |
| 1-1 | 2 | 2 | Non-target |
| 2-1 | 1 | 1 | Non-target |
| . . . | . . . | | . . . |

54a 54b 54c 54d 54

STORAGE SYSTEM, DATA COPY CONTROL METHOD, AND RECORDING MEDIUM

CROSS-REFERENCE TO PRIOR APPLICATION

This application relates to and claims the benefit of priority from Japanese Patent Application No. 2021-171133 filed on Oct. 19, 2021, the entire disclosure of which is incorporated herein by reference.

BACKGROUND

The present disclosure relates to a technology to copy the data of a storage device constituting a parity group to a replacement destination storage device.

In order to prevent the data loss, the data is stored in the storage area of a parity group (PG) in which a plurality of storage devices are made into a RAID (Redundant Array of Independent (or Inexpensive) Disks) configuration. By storing data in the storage area of the parity group like this, it is possible to secure durability to a failure in the storage device.

For example, in the case of using the parity group if a failure occurs in any storage device or a storage device is degraded, the storage device is needed to be replaced. When a storage device constituting the parity group is replaced, so-called collection copy is performed in which the data of a replacement target storage device is generated and copied to a replacement destination storage device using data and parity data stored in storage devices other than the replacement target storage device in the parity group.

Further, as a technology to restore data, Japanese Patent Application Publication No. 2019-212081 discloses a technology to receive other-apparatus summary information indicating a summary value from an external apparatus configured to store the same data and acquire data that is stored in the external apparatus but is not stored in an own apparatus from the external apparatus on the basis of the other-apparatus summary information.

SUMMARY

In the above collection copy in which the data of the replacement target storage device is generated and copied to the replacement destination storage device, data and parity data are needed to be read from a storage device other than the replacement target storage device in the parity group, and the data of the replacement target storage device is also needed to be generated. Therefore, a processing time is increased, a load is placed on the storage devices constituting the parity group, and a load is placed on a processor that performs processing to generate data.

Therefore, there is a possibility that an input/output from a host computer using data stored in the storage area of the parity group has to be stopped or a processing speed is made slow during the collection copy.

The present disclosure has been made in view of the above circumstances and has an object of providing a technology with which it is possible to promptly copy the data of a storage device constituting a parity group to a replacement destination storage device while reducing a load on the parity group.

In order to achieve the above object, a storage system according to an aspect is a storage system including: a plurality of storage devices, and one or more parity groups composed of a plurality of storage devices. The storage system stores hash management information to manage hash values of a prescribed data unit of data of the storage devices constituting a parity group and a hash value of a prescribed data unit of data stored in another storage device that is a storage device other than the storage devices constituting the parity group. A processor of the storage system is configured to determine whether a same data unit as a data unit included in data stored in a replacement target storage device among the storage devices constituting the parity group exists in the other storage device on a basis of the hash values of the hash management information, and copy the same data unit of the other storage device to a replacement destination storage device that serves as a replacement destination of the replacement target storage device when the same data unit as the data unit included in the data stored in the replacement target storage device exists in the other storage device.

BRIEF DESCRIPTION OF THE DRAWINGS

FIG. 2 is a configuration diagram of a drive copy pattern list according to an embodiment;

FIG. 3 is a configuration diagram of a volume meta data according to an embodiment;

FIG. 4 is a configuration diagram of a hash management table according to an embodiment;

FIG. 5 is a configuration diagram of a copy target slot management table according to an embodiment;

DETAILED DESCRIPTION

Embodiments will be described with reference to the drawings. Note that the following embodiments do not intend to limit the invention according to claims, and various elements described in the embodiments and all the combinations of the elements are not always essential for the solving means of the invention.

Note that information will be hereinafter described by an expression such as an "AAA table," an "AAA list," and "AAA data" depending on circumstances. However, information may be expressed by any data structure. That is, an "AAA table," an "AAA list," or "AAA data" may be called "AAA information" to indicate that information does not depend on a data structure. Further, processing will be hereinafter described using a "program" as an operating subject depending on circumstances. Since a program is performed by a processor (for example, a CPU) to perform prescribed processing appropriately using a storage resource (for example, a memory) and/or a communication interface device (for example, a NIC (Network Interface Card), the program may serve as the subject of the processing. Processing in which a program serves as an operating subject may be processing performed by a processor or a computer having the processor.

Figure 1:
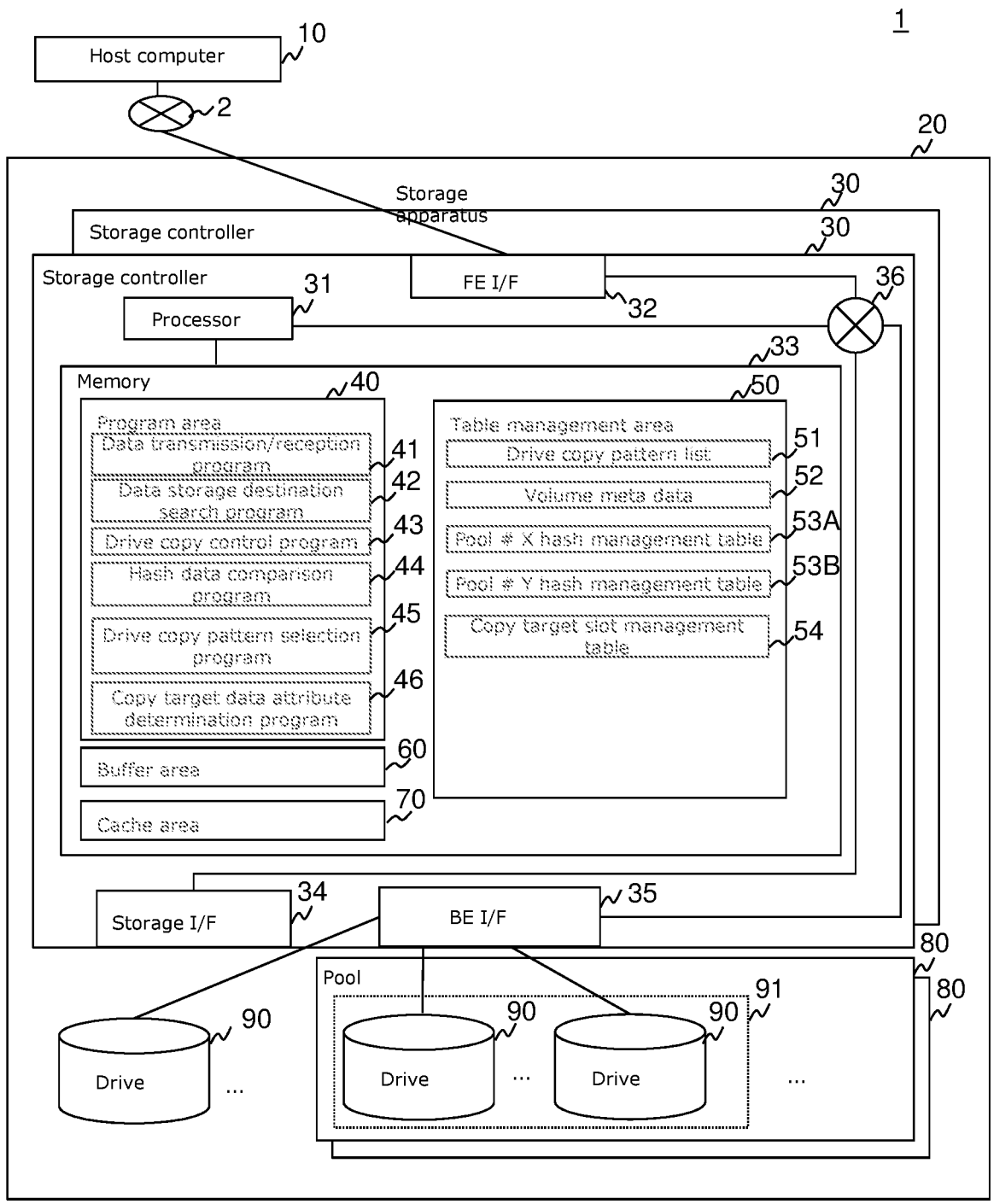
FIG. 1 is an entire configuration diagram of a computer system according to an embodiment.

FIG. 1 is an entire configuration diagram of a computer system according to an embodiment.

A computer system 1 has a host computer 10 and a storage apparatus 20 that is an example of a storage system. The host computer 10 and the storage apparatus 20 are coupled to each other via a network 2. The network 2 is, a wired LAN (Local Area Network), a wireless LAN, a WAN (Wide Area Network), or the like.

The host computer 10 is, for example, a computer that performs an application program. The host computer 10 accesses logical storage areas (virtual volumes) provided by the storage apparatus 20 via the network 2. The host computer 10 accesses data (user data) stored in the virtual volumes of the storage apparatus 20 by issuing a read request or a write request that is an I/O (Input/Output) request to the storage apparatus 20.

The storage apparatus 20 is, for example, a computer and includes one or more storage controllers 30 and a plurality of drives 90 that are an example of storage devices.

The drives 90 are, for example, hard disks, flash memories, or the like and store data (user data) that are used by the host computer 10.

In the present embodiment, in the storage apparatus 20 a plurality of parity groups 91 having a RAID configuration are constituted by the plurality of drives 90, and one or more pools 80 whose storage area is constituted by the storage areas of the one or more parity groups 91. The parity groups 91 may have the configuration of 3D1P or 7D1P of RAID5.

The pool 80 has a virtual volume based on a storage area. The virtual volume may provide a volume to which the host computer 10 is directly accessible. Further, in the pool 80, a de-duplication target (DRD) or a non-de-duplication target (Not-DRD) may be configured as the attribute of data stored in the virtual volume in units of a slot that has the prescribed data size of the volume. Further, the storage areas of the parity group 91 may not be used as the storage areas of the pool 80, and volumes based on the storage areas of the parity group 91 may be provided to the host computer 10 as virtual volumes.

The storage controller 30 includes a processor 31, a front-end interface (FE I/F) 32, a memory 33, a storage interface (storage I/F) 34, and a back-end interface (BE I/F) 35. The processor 31, the FE I/F 32, the memory 33, the storage I/F 34, and the BE I/F 35 are coupled to each other via, for example, an internal network 36 such as a bus.

The processor 31 performs various processing according to programs stored in the memory 33.

The FE I/F 32 is, for example, an interface such as a wired LAN card and a wireless LAN card and communicates with other apparatuses (for example, the host computer 10) via the network 2.

The memory 33 is, for example, a RAM (Random Access Memory) or a memory including the RAM and stores programs that are performed by the processor 31 or necessary information.

The memory 33 includes a program area 40, a table management area 50, a buffer area 60, and a cache area 70.

In the program area 40, a data transmission/reception program 41, a data storage destination search program 42, a drive copy control program 43, a hash data comparison program 44, a drive copy pattern selection program 45, a copy target data attribute determination program 46, and a de-duplication program for performing the de-duplication of user data in the pools 80, or the like are stored. In the present embodiment, the data transmission/reception program 41, the data storage destination search program 42, the drive copy control program 43, the hash data comparison program 44, the drive copy pattern selection program 45, and the copy target data attribute determination program 46 are an example of a data copy control program.

The de-duplication program performs de-duplication processing for each of the pools 80. Specifically, the de-duplication program calculates the hash value of a unit (de-duplication unit: an example of a data unit) that is subjected to prescribed de-duplication in a volume inside a pool. When the pool includes the data of the same hash value, the de-duplication program deletes the data (duplication data) from a virtual volume to which the host computer 10 directly accesses and stores the data in another volume to manage. As the function of such a de-duplication program, the function of a computer system described in Japanese Patent Application Publication No. 2019-159605 may be used.

In the table management area 50, a drive copy pattern list 51, volume meta data 52, hash management tables 53 (such as a pool #X hash management table 53A and a pool #Y hash management table 53B), and a copy target slot management table 54 are stored.

In the buffer area 60, temporarily-stored data is stored. In the cache area 70, user data read from the drives 90 and user data written from the host computer 10 are stored.

The storage I/F 34 is an interface that is used to communicate with other storage apparatuses.

The BE I/F 35 is an interface that is coupled to the plurality of drives 90 and used to communicate with the plurality of drives 90.

Next, the drive copy pattern list 51 will be described.

FIG. 2 is a configuration diagram of the drive copy pattern list according to an embodiment.

The drive copy pattern list 51 is a list for managing the patterns (copy patterns) of processing to copy a drive. The drive copy pattern list 51 stores entries for each copy pattern. The entry of the drive copy pattern list 51 includes the fields of a copy pattern 51a, a data attribute 51b, a hash match 51c.

In the copy pattern 51a, the identification name of the copy pattern corresponding to the entry is stored. In the data attribute 51b, data attribute at which the copy pattern corresponding to the entry is targeted is stored. The data attributes include DRD (Data ReDuction) indicating that data is a de-duplication target and non-DRD indicating that data is not a de-duplication target. In the hash match 51c, the state of hash value at which the copy pattern corresponding to the entry is targeted, that is, state indicating whether the hash value matches or does not match another hash value is stored.

Next, the volume meta data 52 will be described.

FIG. 3 is a configuration diagram of the volume meta data according to an embodiment.

The volume meta data 52 is data for managing the data attributes of the respective slots of the volumes. The volume meta data 52 stores entries for each slot of the volume. The entry of the volume meta data 52 includes the fields of a VOL #52a, a slot #52b, and a data attribute 52c.

In the VOL #52a, identification information for identifying the volume including the slot corresponding to the entry, for example, volume number (volume #) is stored. In the slot #52b, identification information for identifying the slot corresponding to the entry, for example, slot number (slot #) is stored. In the data attribute 52c, the data attribute of the slot corresponding to the entry is stored. The data attributes include DRD indicating that data is a de-duplication target and non-DRD indicating that data is not a de-duplication target.

Next, the hash management table 53 will be described.

FIG. 4 is a configuration diagram of the hash management table according to an embodiment.

The hash management table 53 is a table that is generated for each of the pools 80 and used to manage information for each data of a prescribed de-duplication unit in the volumes of the pools 80. The hash management table 53 stores entries corresponding to the data of the de-duplication unit. Here, the de-duplication unit may be a prescribed size in the volumes. The entry of the hash management table 53 includes the fields of a VOL #53a, a hash value 53b, and a data storage destination address 53c.

In the VOL #53a, identification information for identifying the volumes storing the data of the de-duplication unit corresponding to the entry, for example, volume number is stored. In the hash value 53b, hash value for the data of the de-duplication unit corresponding to the entry is stored. In the data storage destination address 53c, information (data storage destination addresses) indicating positions at which the data of the de-duplication unit corresponding to the entry is actually stored is stored.

Next, the copy target slot management table 54 will be described.

FIG. 5 is a configuration diagram of the copy target slot management table according to an embodiment.

The copy target slot management table 54 is a table for managing information whether respective slots are copy targets to be copied to a replacement destination drive (replacement destination storage device). The copy target slot management table 54 stores entries for each slot. The entry of the copy target slot management table 54 includes the fields of a PG #54a, a drive #54b, a slot #54c, and a drive copy target 54d.

In the PG #54a, identification information for identifying the parity group in which the slot corresponding to the entry is stored, for example, the parity group number (PG #) is stored. In the drive #54b, the number (drive #) of the drive inside the parity group in which the slot corresponding to the entry is stored is stored. In the slot #54c, identification information for identifying the slot corresponding to the entry, for example, the slot number (slot #) is stored. In the drive copy target 54d, information indicating whether the data of the slots corresponding to the entry is a copy target is stored. When determining that any drive of the parity groups is needed to be replaced, the storage controller 30 of the storage apparatus 20 considers that the drive is a replacement target drive and configures the value of the drive copy target 54d of an entry corresponding to a slot stored in the replacement target drive to be a copy target.

Next, the outline of drive copy processing to copy the data of a replacement target drive (replacement target storage device) to a replacement destination drive (replacement destination storage device) in the storage apparatus 20 will be described.

Figure 6:
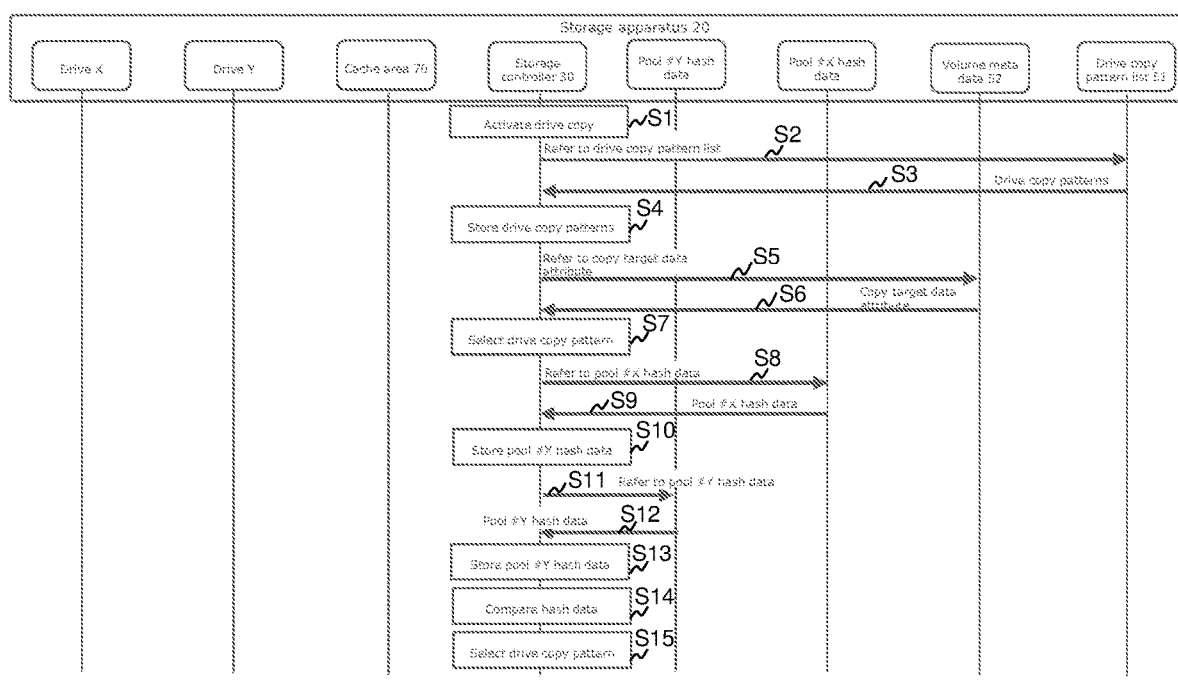
FIG. 6 is a first sequence diagram showing the outline of drive copy processing according to an embodiment.
Figure 7:
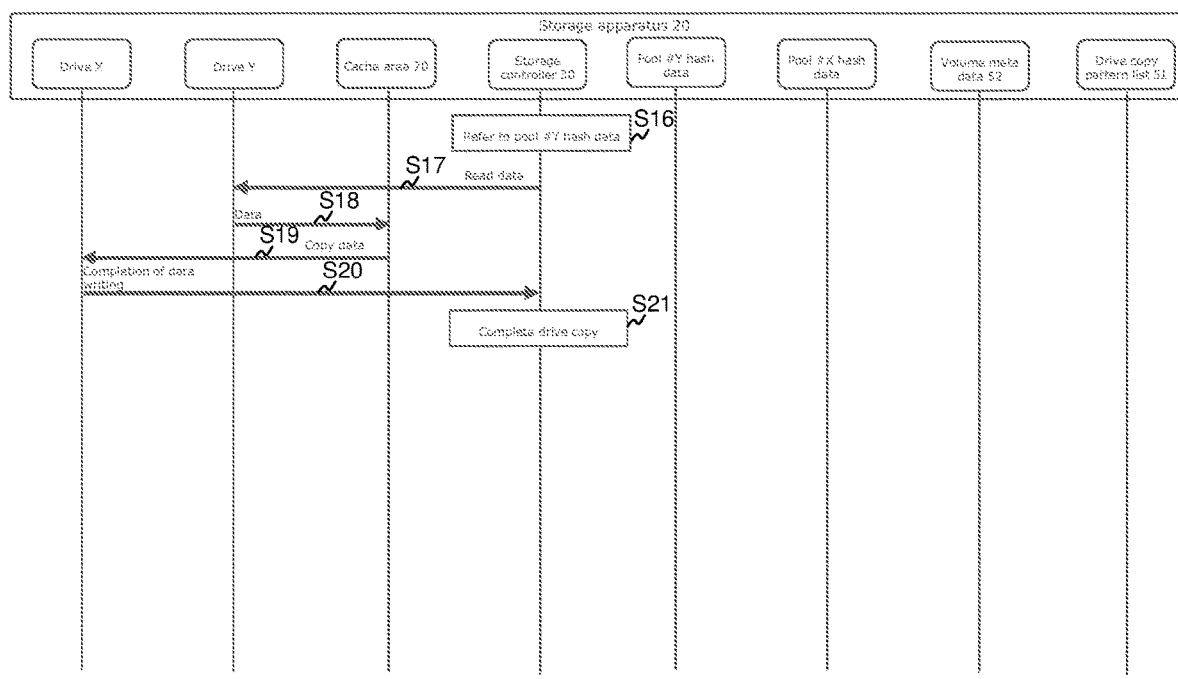
FIG. 7 is a second sequence diagram showing the outline of the drive copy processing according to an embodiment.

FIG. 6 is a first sequence diagram showing the outline of the drive copy processing according to an embodiment. FIG. 7 is a second sequence diagram showing the outline of the drive copy processing according to an embodiment.

The drive copy processing is performed, for example, when any of the drives 90 of the parity groups 91 is needed to be replaced in the storage apparatus 20. For example, when it is detected that a failure has occurred in any of the drives 90 or when it is detected that any of the drives 90 has been degraded to a level at which the drive 90 is needed to be replaced, the drive copy processing is performed.

The storage controller 30 of the storage apparatus 20 activates the drive copy processing (step S1), refers to the drive copy pattern list 51 (step S2), acquires drive copy patterns (step S3), and stores the drive copy patterns in the work area of the memory 33 (step S4).

Next, the storage controller 30 refers to the volume meta data 52 and refers to the data attribute (copy target data attribute) of the slot of a copy target (replacement target) drive (a drive X in this example) (step S5), acquires the copy target data attribute (step S6), and selects a drive copy pattern to be performed from among the stored drive copy patterns on the basis of the acquired copy target data attribute (step S7).

Here, the following processing will be described assuming that the copy target data attribute is DRD and the drive copy pattern B or the drive copy pattern C of the drive copy pattern list 51 is selected.

The storage controller 30 refers to the hash management table 53 (the pool #X hash management table 53A) of a pool (a pool X in this example) constituted by a PG including the copy target drive X (step S8), acquires the hash data (the hash value and the storage destination address) of data included in the volume of the drive X (step S9), and stores the acquired hash data in the work area of the memory 33 (step S10).

Then, the storage controller 30 refers to the hash management table 53 (the pool #Y hash management table 53B) of another pool (a pool Y in this example) different from the pool X (step S11), acquires all the hash data (the hash values and the storage destination addresses) of data included in the pool Y (step S12), and stores the acquired hash data (pool #Y hash data) in the work area of the memory 33 (step S13).

Next, the storage controller 30 compares the hash value of the hash data of the data included in the volume of the drive X with the hash values of the pool #Y hash data and determines whether the hash values are matched to each other (step S14).

Then, the storage controller 30 selects any of the drive copy pattern B and the drive copy pattern C on the basis of the comparison result of the hash values (step S15). Here, in this example, it is assumed that the hash values are matched to each other and the drive copy pattern C is selected.

Next, the storage controller 30 refers to the pool #Y hash data and specifies a storage destination address corresponding to the matched hash value (step S16).

Then, the storage controller 30 transmits a read request for reading data corresponding to the matched hash value to the drive (here, the drive Y) of the specified storage destination address (step S17), receives the target data of the read request from the drive Y and stores the same in the cache area 70 (step S18), and copies the data stored in the cache area 70 to a copy destination drive (replacement destination drive) (step S19).

The storage controller 30 receives the notification of the completion of the data writing from the replacement destination drive (step S20). After the copy of all the data of the volume of the drive X is completed, the storage controller 30 completes the drive copy processing (step S21).

Next, the details of the drive copy processing will be described.

Figure 8:
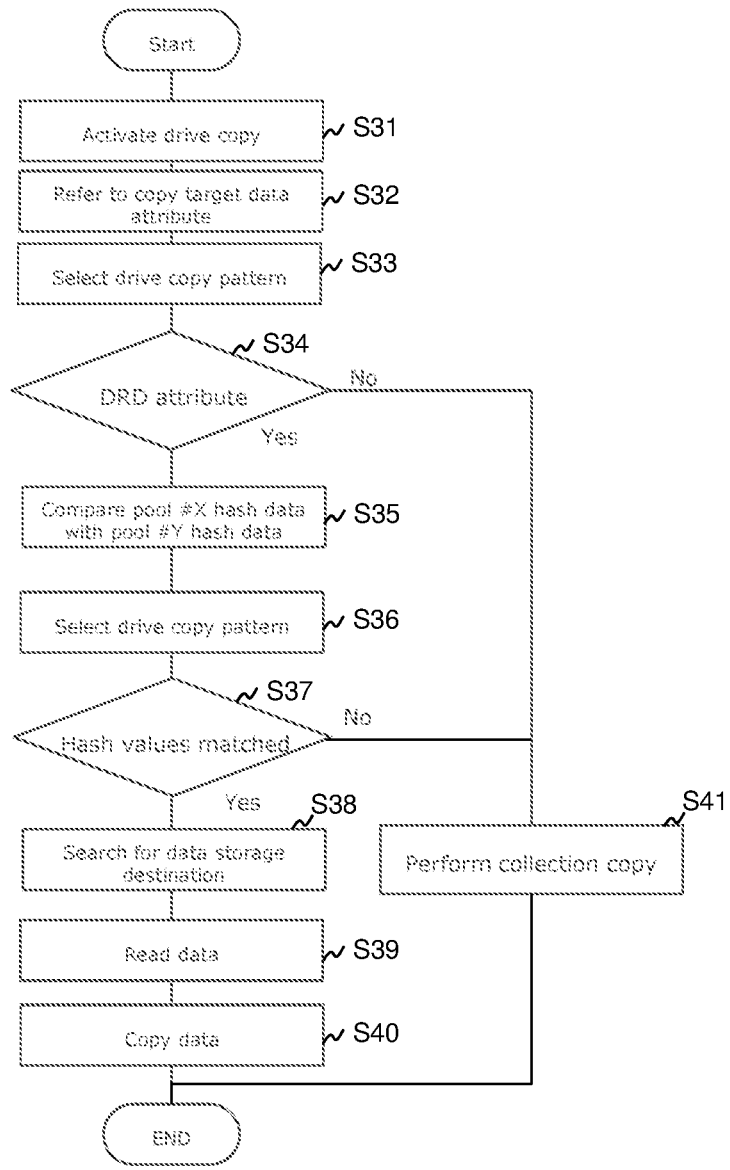
FIG. 8 is a flowchart of the drive copy processing according to an embodiment.

FIG. 8 is a flowchart of the drive copy processing according to an embodiment.

The storage apparatus 20 activates the drive copy processing (step S31), refers to the volume meta data 52 to refer to the data attribute (copy target data attribute) of the slot of a copy target (replacement target) drive (step S32), and selects a drive copy pattern to be performed from among stored drive copy patterns on the basis of the copy target data attribute (step S33).

When a drive copy pattern where the data attribute is DRD is selected (step S34: Yes), the storage apparatus 20 compares the hash data (pool #X hash data in this example) of the data of the replacement target drive with the hash data of the data of another pool (pool #Y) different from a pool constituted by the replacement target drive (step S35). Note that the processing of steps S34 to S41 is performed on the respective slots of a volume stored in the replacement target drive, and the processing of steps S35 to S41 is performed on each of all the data of the de-duplication unit of the processing target slots.

Next, the storage apparatus 20 selects the drive copy pattern to be performed on the basis of the comparison result of the hash data (step S36).

When a drive copy pattern where the hash value of the data of the replacement target drive and the hash value of the data of the other pool are matched to each other is selected (step S37: Yes), the storage controller 30 searches for the storage destination of the data of the matched hash value to specify a storage destination address (step S38), transmits a read request for reading the data to the drive of the specified storage destination address (step S39), and receives the target data from the drive and copies the same to a replacement destination drive (step S40).

On the other hand, when a drive copy pattern where the data attribute is not DRD is selected (step S34: No) or when a drive copy pattern where the hash value of the data of the replacement target drive and the hash value of the data of the other pool are not matched to each other (step S37: No), the storage apparatus 20 performs collection copy in which the data of the replacement target drive is generated using the data and the parity data of other drives constituting a PG with the replacement target drive and copied to the replacement destination drive (step S41). When performing the processing of steps S34 to S41 on all the slots of the volume stored in the replacement target drive, the storage apparatus 20 ends the drive copy processing.

Next, the details of a processing operation between configurations inside the storage apparatus in the drive copy processing will be described.

Figure 9:
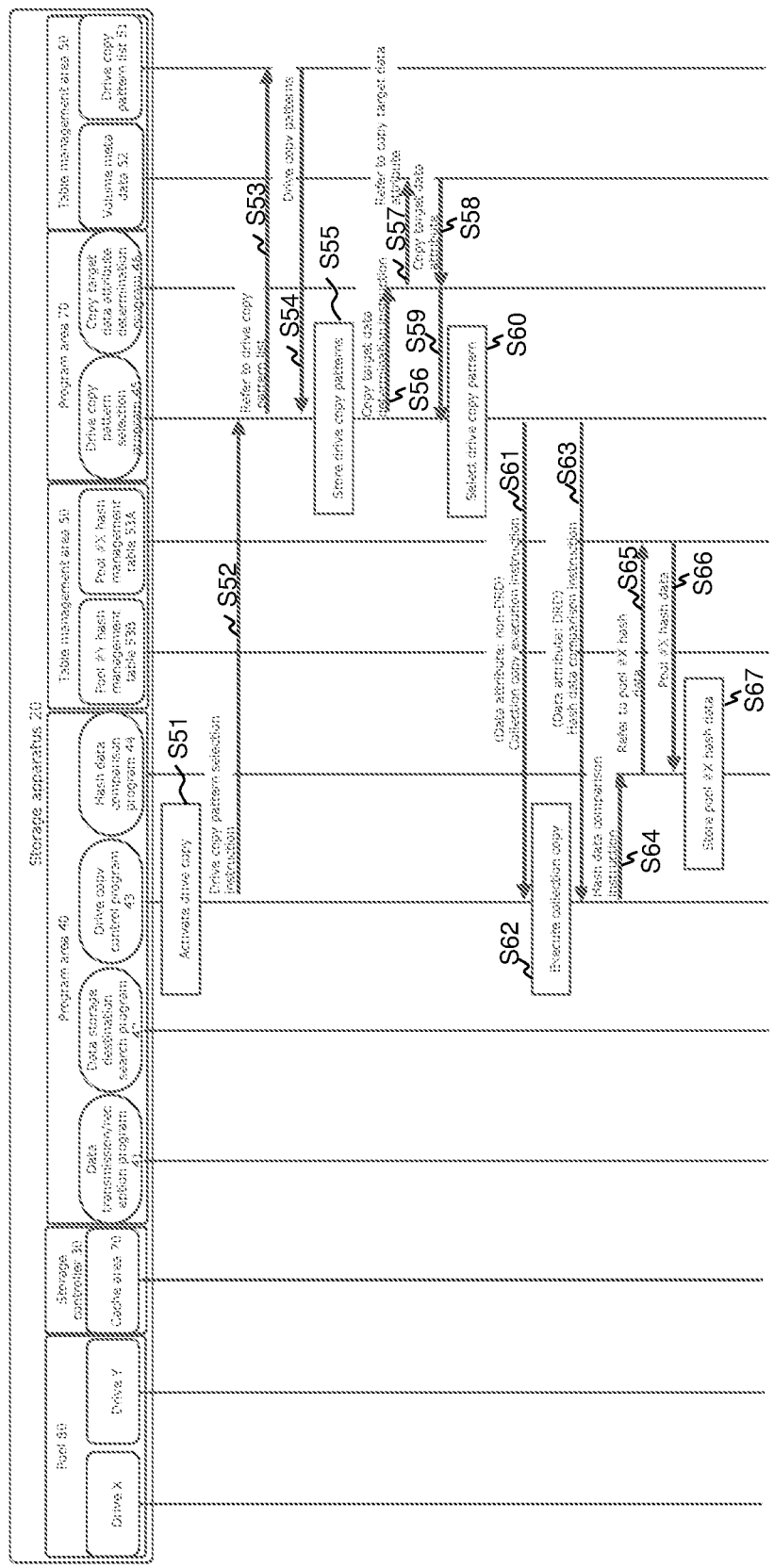
FIG. 9 is a first sequence diagram showing the details of the drive copy processing according to an embodiment.
Figure 10:
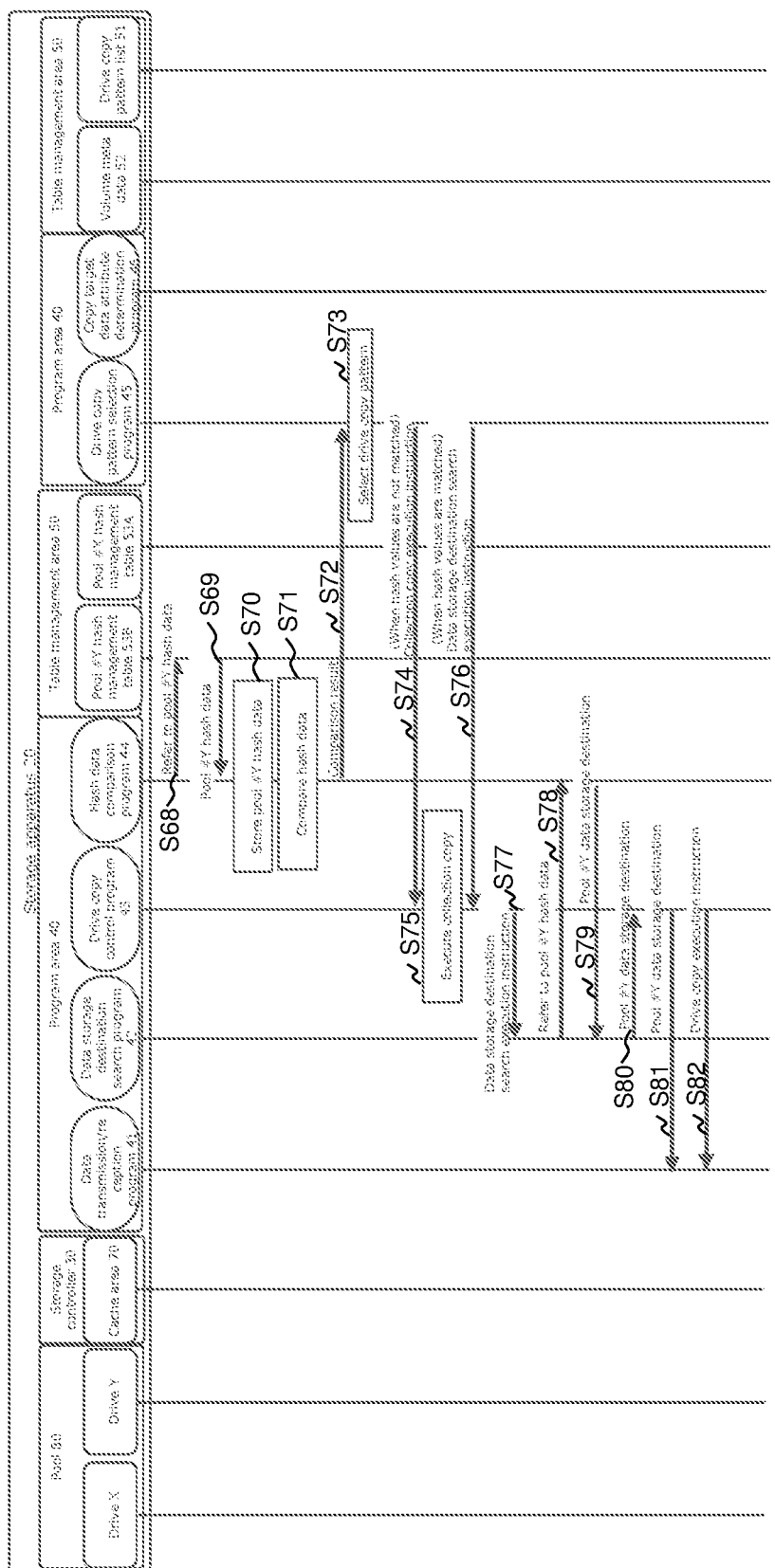
FIG. 10 is a second sequence diagram showing the details of the drive copy processing according to an embodiment.
Figure 11:
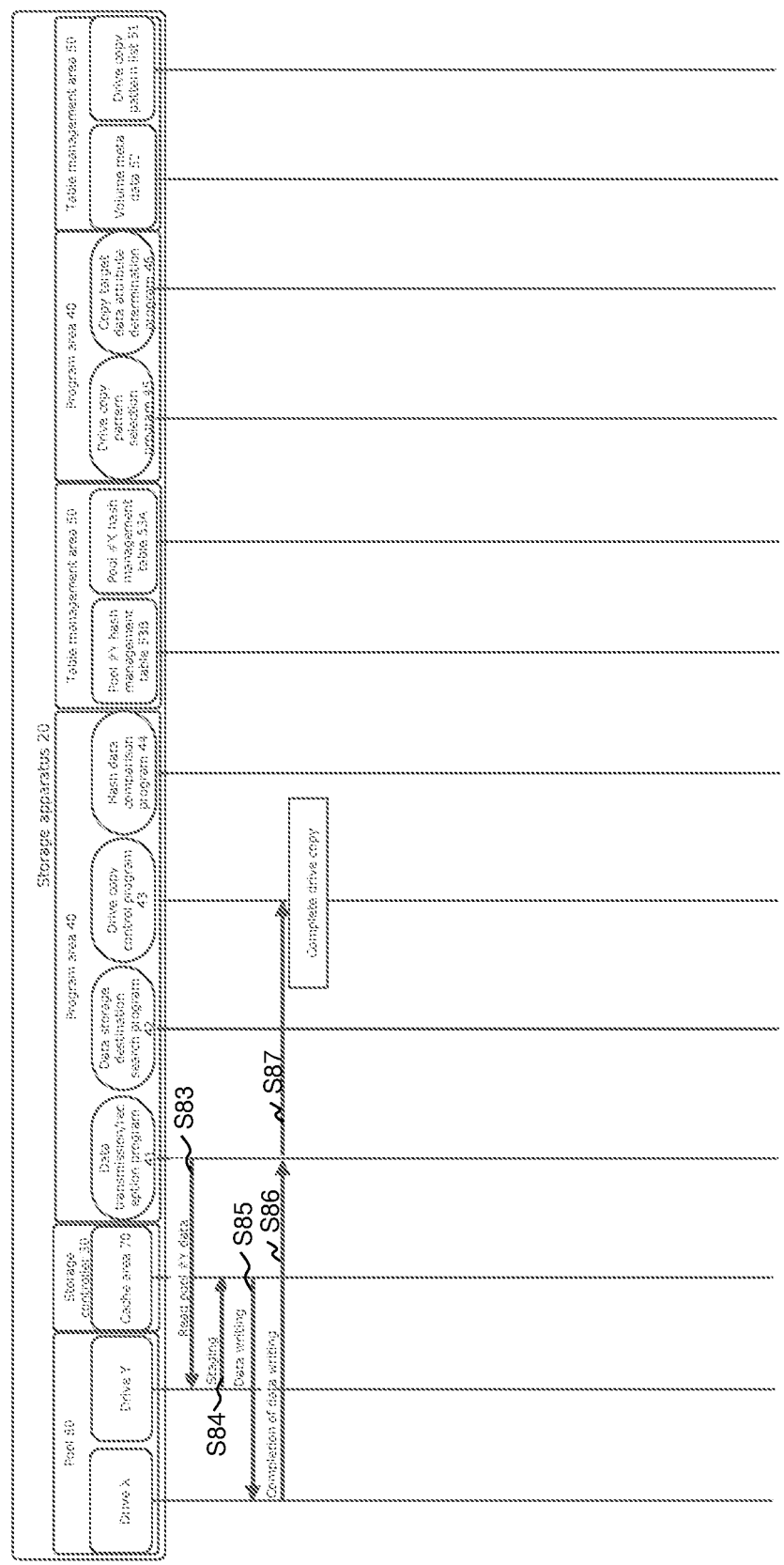
FIG. 11 is a third sequence diagram showing the details of the drive copy processing according to an embodiment.

FIG. 9 is a first sequence diagram showing the details of the drive copy processing according to an embodiment. FIG. 10 is a second sequence diagram showing the details of the drive copy processing according to an embodiment. FIG. 11 is a third sequence diagram showing the details of the drive copy processing according to an embodiment.

The drive copy control program 43 (strictly, the processor 31 that executes the drive copy control program 43) of the storage apparatus 20 activates the drive copy processing (step S51) and transmits a drive copy pattern selection instruction to the drive copy pattern selection program 45 (step S52). The drive copy pattern selection program 45 refers to the drive copy pattern list 51 (step S53), acquires drive copy patterns (step S54), and stores the drive copy patterns in the work area of the memory 33 (step S55).

Next, the drive copy pattern selection program 45 transmits a copy target data determination instruction to the copy target data attribute determination program 46 (step S56).

The copy target data attribute determination program 46 refers to the volume meta data 52 to refer to the data attribute (copy target data attribute) of the slot of a copy target (replacement target) drive (step S57), acquires the copy target data attribute (step S58), and transmits the acquired copy target data attribute to the drive copy pattern selection program 45 (step S59).

The drive copy pattern selection program 45 acquires the copy target data attribute and selects a drive copy pattern (step S60).

When the copy target data attribute is non-DRD, the drive copy pattern selection program 45 transmits a collection copy execution instruction to the drive copy control program 43 (step S61). When receiving the collection copy execution instruction, the drive copy control program 43 executes collection copy (step S62).

On the other hand, when the copy target data attribute is DRD, the drive copy pattern selection program 45 transmits a hash data comparison instruction to the drive copy control program 43 (step S63).

When receiving the hash data comparison instruction, the drive copy control program 43 transmits the hash data comparison instruction to the hash data comparison program 44 (step S64). The hash data comparison program 44 refers to the hash management table 53 (the pool #X hash management table 53A) of a pool (a pool X in this example) constituted by a PG including a copy target drive X (step S65), acquires the hash data (the hash value and the storage destination address) of data included in the volume of the drive X (step S66), and stores the acquired hash data in the work area of the memory 33 (step S67).

Then, the hash data comparison program 44 refers to the hash management table 53 (the pool #Y hash management table 53B) of another pool (a pool Y in this example) different from the pool X (step S68), acquires all the hash data (the hash values and the storage destination addresses) of data included in the pool Y (step S69), and stores the acquired hash data (pool #Y hash data) in the work area of the memory 33 (step S70).

Next, the hash data comparison program 44 compares the hash value of the hash data of the data included in the volume of the drive X with the hash values of the pool #Y hash data and determines whether the hash values are matched to each other (step S71). Note that the processing of steps S71 to S87 is performed on each data of a de-duplication unit included in the volume of the drive X.

Then, the hash data comparison program 44 transmits the comparison result of the hash values to the drive copy pattern selection program 45 (step S72).

Next, the drive copy pattern selection program 45 selects any of the drive copy pattern B and the drive copy pattern C on the basis of the received comparison result (step S73).

Here, when the comparison result shows that the hash values are not matched to each other, the drive copy pattern selection program 45 selects the drive copy pattern B and transmits a collection copy execution instruction to the drive copy control program 43.

When receiving the collection copy execution instruction, the drive copy control program 43 performs collection copy in which the data of the copy target drive X is generated on the basis of the data and the parity data of other drives of the parity group and copied to a copy destination drive (step S75)

On the other hand, when the hash values are matched to each other, the drive copy pattern selection program 45 selects the drive copy pattern C and transmits a data storage destination search execution instruction to the drive copy control program 43 (step S76).

When receiving the data storage destination search execution instruction, the drive copy control program 43 transmits the data storage destination search execution instruction to the data storage destination search program 42 (step S77).

The data storage destination search program 42 refers to the hash management table 53 of the pool Y (the pool #Y hash management table 53B) (step S78) and acquires a storage destination (pool #Y data storage destination) in which data corresponding to the matched hash value is stored (step S79).

The data storage destination search program 42 transmits the acquired pool #Y data storage destination to the drive copy control program 43 (step S80).

The drive copy control program 43 transmits the acquired pool #Y data storage destination to the data transmission/reception program 41 (step S81) and transmits an instruction (drive copy execution instruction) to copy the data of the pool #Y data storage destination to the copy destination drive to the data transmission/reception program 41 (step S82).

The data transmission/reception program 41 reads the data of the pool #Y data storage destination from a drive Y (step S83), performs the staging of the data in the cache area 70, and writes the data in a copy destination drive X (here, the replacement destination drive of the drive X is also called the drive X for the sake of convenience) (step S85). The drive X notifies the data transmission/reception program 41 of the completion of the data writing (step S86).

The data transmission/reception program 41 notifies the drive copy control program 43 of the completion of the data writing (step S87). The drive copy control program 43 ends the drive copy processing when the writing of all the data of the de-duplication unit included in the volume of the drive X is completed.

According to the above embodiments, the same data as the data of a storage target drive is stored in a storage destination drive when the data is stored in other pools. Therefore, collection copy is not needed to be executed. In addition, it is possible to reduce a processing load and shorten a processing time. Further, since the collection copy is not needed to be executed for the data, it is possible to reduce a load on a parity group including the storage target drive during drive copy and properly perform I/O processing from the host computer 10 on the parity group.

Further, in the above embodiments, a determination is made as to whether the data of a storage target drive and the data of other pools are matched to each other using hash values calculated to perform de-duplication processing for each pool. Therefore, processing to newly calculate a hash value is not needed to be performed. As a result, it is possible to reduce a processing load.

Note that the present invention is not limited to the above embodiments but may be appropriately modified and carried out without departing from its gist.

For example, in the above embodiments, target drives for which a determination is made as to whether the same data as the data of a replacement target drive is stored are the drives of other parity groups constituting other pools. However, the present invention is not limited to this. For example, the target drives may be the drives of other parity groups not constituting pools or drives not constituting parity groups.

Further, in the above embodiments, a determination is made as to whether the same data as the data of a replacement target drive is stored in other drives using a hash management table calculated in de-duplication processing. However, the present invention is not limited to this. For example, the de-duplication processing is not performed for data stored in other drives, but the hash values of a data unit that is the same in size as a de-duplication unit may be calculated in advance and used.

Further, a part or all of the processing performed by the program in the above embodiments may be performed by a hardware circuit. Further, the program in the above embodiments may be installed from a program source. The program source may be a program distribution server or a recording medium (for example, a transportable recording medium).

What is claimed is:

1. A storage system comprising: a plurality of storage devices; and one or more parity groups composed of the plurality of storage devices; and a processor, wherein the storage system stores: copy pattern information indicating at least one copy pattern corresponding to a first data attribute and at least one copy pattern corresponding to a second data attribute that is different from the first data attribute, hash management information including a hash value and a data storage address for a prescribed data unit of data of the storage devices constituting a parity group and a hash value of a prescribed data unit of data stored in another storage device that is a storage device other than the storage device constituting the parity group, and attribute information indicating a first attribute or a second attribute for each prescribed data unit, wherein the processor is configured to: determine the copy pattern of a data unit included in data stored in a replacement target storage device among the storage devices constituting the parity group based on whether the data unit has the first attribute or the second attribute based on the copy pattern information and the attribute information, determine whether a hash value of the data unit of the replacement target storage device is the same as a hash value of the other storage device based on the hash management information, upon determining the hash value of the replacement target storage device and the hash value of the other storage device is the same, determine the data storage address for the data unit corresponding to the same hash value based on the hash management information, copy the data unit corresponding to the same hash value from the other storage device to a replacement destination storage device that serves as a replacement destination of the replacement target storage device and upon determining the hash value of the replacement target storage device and the hash value of the other storage device is different, data of the replacement destination storage device is generated based on the data and parity data of other drives within the parity group of the replacement target storage device.

2. The storage system according to claim 1, wherein the other storage device constitutes a parity group different from the parity group with a plurality of other storage devices.

3. The storage system according to claim 2, further comprising: a plurality of pools constituted by one or more parity groups, wherein the processor of the storage system is configured to; perform de-duplication to calculate hash values of prescribed data units for data stored in volumes of one or more parity groups constituting a same pool, specify a same data unit on a basis of the calculated hash values, and prevent the same data unit from being duplicately stored in each of the pools, and store the hash values calculated to perform the de-duplication in the hash management information.

4. The storage system according to claim 3, wherein the processor of the storage system is configured to:
store data of a duplicated data unit in a volume different from a virtual volume without leaving the data in the virtual volume to which a host computer directly accesses in the de-duplication.

5. The storage system according to claim 1, wherein the processor of the storage system is configured to:

perform a collection copy process when a volume including a data unit of a the replacement target storage device is a volume that is not subjected to de-duplication to be carved out from a pool and or is a volume that is not carved out from the pool, and perform the collection copy process for the data unit of the volume on a basis of data of a storage device other than the replacement target storage device of the parity group when the volume including the data unit of the replacement target storage device is a volume that is subjected to the de-duplication to be carved out from the pool.

6. A data copy control method by a storage system including a plurality of storage devices and having one or more parity groups constituted by a plurality of storage devices, the method comprising: storing copy pattern information indicating at least one copy pattern corresponding to a first data attribute and at least one copy pattern corresponding to a second data attribute that is different from the first data attribute; storing hash management information including to a hash value and a data storage address for a prescribed data unit of data of the storage devices constituting a parity group and a hash value of a prescribed data unit of data stored in another storage device that is a storage device other than the storage devices constituting the parity group; storing attribute information indicating a first attribute or a second data attribute for each prescribed data unit; determining the copy pattern of a data unit included in data stored in a replacement target storage device among the storage devices constituting the parity group based on whether the data unit has the first data attribute or the second data attribute based on the copy pattern information and the attribute information; determining whether a hash value of the data unit of the replacement target storage device is the same as a hash value of the other storage device on a basis of the hash values of the hash management information; upon determining the hash value of the replacement target storage device and the hash value of the other storage device is the same, determine the data storage address for the data unit corresponding to the same hash value based on the hash management information; copying the data unit corresponding to the same hash value from the other storage device to a replacement destination storage device that serves as a replacement destination of the replacement target storage device; and upon determining the hash value of the replacement target storage device and the hash value of the other storage device is different, generating data of the replacement destination storage device based on the data and parity data of other drives within the parity group of the replacement target storage device.

7. A non-transitory computer-readable recording medium that records a data copy control program performed by a computer constituting at least a part of a storage system including a plurality of storage devices and having one or more parity groups constituted by a plurality of storage devices, when executed by a processor, the data copy control program executes steps comprising: storing copy pattern information indicating at least one copy pattern corresponding to a first data attribute and at least one copy pattern corresponding to a second data attribute that is different from the first data attribute; storing hash management information including hash values and a data storage address for a prescribed data unit of data of the storage devices constituting the parity group and a hash value of a prescribed data unit of data stored in another storage device that is a storage device other than the storage devices constituting the parity group; attribute information indicating a first attribute or a second attribute for each prescribed data unit; determining the copy pattern of a data unit included in data stored in a replacement target storage device among the storage devices constituting the parity group based on whether the data unit has the first attribute or the second attribute based on the copy pattern information and the attribute information; determining whether a hash value of the data unit of the replacement target storage device is the same as a hash value of the other storage device based on the hash management information; upon determining the hash value of the replacement target storage device and the hash value of the other storage device is the same, determine the storage address for the data unit corresponding to the same hash value based on the hash management information; copy the data unit corresponding to the same hash value from the other storage device to a replacement destination storage device that serves as a replacement destination of the replacement target storage device; and upon determining the hash value of the replacement target storage device and the hash value of the other storage device is different, data of the replacement destination storage device is generated based on the data and parity data of other drives within the parity group of the replacement target storage device.

* * * * *